(12) United States Patent
Bian et al.

(10) Patent No.: US 8,747,628 B2
(45) Date of Patent: Jun. 10, 2014

(54) PERPENDICULAR MAGNETIC RECORDING MEDIA WITH OXIDE-CONTAINING EXCHANGE COUPLING LAYER

(75) Inventors: Xiaoping Bian, Saratoga, CA (US);
Jack Jyh-Kau Chang, Fremont, CA (US); Qing Dai, San Jose, CA (US);
Hoa V. Do, Fremont, CA (US);
Yoshihiro Ikeda, San Jose, CA (US);
Kentaro Takano, San Jose, CA (US);
Chu S. Tran, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/438,804

(22) Filed: Apr. 3, 2012

(65) Prior Publication Data

US 2012/0186974 A1   Jul. 26, 2012

Related U.S. Application Data

(62) Division of application No. 12/638,905, filed on Dec. 15, 2009, now Pat. No. 8,168,310.

(51) Int. Cl.
*C23C 14/08*   (2006.01)

(52) U.S. Cl.
USPC ...... 204/192.15; 427/529; 428/800; 428/828; 428/828.1; 360/59

(58) Field of Classification Search
None
See application file for complete search history.

(56) References Cited

U.S. PATENT DOCUMENTS

| | | | |
|---|---|---|---|
| 5,783,262 A * | 7/1998 | Chaiken et al. | 427/529 |
| 6,641,901 B2 | 11/2003 | Yoshida et al. | |
| 7,384,699 B2 | 6/2008 | Nolan et al. | |
| 7,425,377 B2 | 9/2008 | Fullerton et al. | |
| 7,470,474 B2 | 12/2008 | Sakawaki et al. | |

(Continued)

FOREIGN PATENT DOCUMENTS

| | | |
|---|---|---|
| JP | 2008/065879 A | 3/2008 |
| JP | 2008/287853 A | 11/2008 |
| WO | 2009/044794 A1 | 4/2009 |
| WO | WO 2009044794 A1 * | 4/2009 |

OTHER PUBLICATIONS

Inaba et al., "Preliminary Study on (CoPtCr/NiFe)—SiO2 Hard/Soft-Stacked Perpendicular Recording Media," 2005 IEEE, IEEE Transactions on Magnetics, vol. 41, No. 10, Oct. 2005, pp. 3136-3138.

(Continued)

*Primary Examiner* — Keith Hendricks
*Assistant Examiner* — Timon Wanga
(74) *Attorney, Agent, or Firm* — Zilka-Kotab, PC

(57) ABSTRACT

A method according to one embodiment includes forming a high Ku first oxide magnetic layer above a substrate by sputtering; forming a low Ku second oxide magnetic layer above the first oxide magnetic layer by sputtering; forming an exchange coupling layer of CoCrPt-oxide above the second oxide magnetic layer; and forming a magnetic cap layer above the exchange coupling layer. Additional systems and methods are also presented.

20 Claims, 9 Drawing Sheets

(56) References Cited

U.S. PATENT DOCUMENTS

| | | | |
|---|---|---|---|
| 7,479,332 | B2 | 1/2009 | Fullerton et al. |
| 7,510,788 | B2 * | 3/2009 | Kawada .................. 428/828.1 |
| 7,976,965 | B2 | 7/2011 | Shimizu et al. |
| 2006/0177703 | A1 | 8/2006 | Takenoiri et al. |
| 2006/0204791 | A1 | 9/2006 | Sakawaki et al. |
| 2006/0246323 | A1 | 11/2006 | Liu et al. |
| 2006/0286413 | A1 | 12/2006 | Liu et al. |
| 2007/0212574 | A1 * | 9/2007 | Berger et al. ................ 428/828 |
| 2007/0248843 | A1 | 10/2007 | Wu et al. |
| 2008/0070065 | A1 | 3/2008 | Berger et al. |
| 2008/0138662 | A1 | 6/2008 | Berger et al. |
| 2008/0144213 | A1 | 6/2008 | Berger et al. |
| 2008/0180843 | A1 | 7/2008 | Zhang et al. |
| 2008/0299416 | A1 | 12/2008 | Yoon et al. |
| 2009/0040644 | A1 * | 2/2009 | Lu et al. ........................ 360/59 |
| 2009/0052074 | A1 | 2/2009 | Nakagawa et al. |
| 2009/0073599 | A1 | 3/2009 | Nemoto et al. |
| 2009/0080110 | A1 | 3/2009 | Berger et al. |
| 2009/0081484 | A1 | 3/2009 | Watanabe |
| 2009/0109579 | A1 | 4/2009 | Takahoshi et al. |
| 2009/0110961 | A1 | 4/2009 | Shibata et al. |
| 2009/0117408 | A1 | 5/2009 | Umezawa et al. |
| 2010/0247962 | A1 * | 9/2010 | Sasaki .......................... 428/800 |

OTHER PUBLICATIONS

Tang et al., "Design Consideration and Practical Solution of High-Performance Perpendicular Magnetic Recording Media," 2009 IEEE, IEEE Transactions on Magnetics, vol. 45, No. 2, Feb. 2009, pp. 786-792.

Choe et al., "Control of Exchange Coupling Between Granular Oxide and Highly Exchange Coupled Cap Layers and the Effect on Perpendicular Magnetic Switching and Recording Characteristics," 2009 IEEE, IEEE Transactions on Magnetics, vol. 45, No. 6, Jun. 2009, pp. 2694-2700.

Zhang et al., "Effects of exchange coupling between cap layer and oxide layer on the recording performance in perpendicular media," 2009 American Institute of Physics, Journal of Applied Physics, vol. 105, 2009, pp. 07B710/1-07B710/3.

Notice of Allowance and Fee(s) Due from U.S. Appl. No. 12/638,905 dated Feb. 1, 2012.

Final Office Action Summary from U.S. Appl. No. 12/638,905 dated Oct. 19, 2011.

Non-Final Office Action from U.S. Appl. No. 12/638,905 dated May 20, 2011.

Restriction/Election Requirement from U.S. Appl. No. 12/638,905 dated Mar. 10, 2011.

* cited by examiner

| CELL | OW | 2TSoNR | 2TSNR | Oxide 1 | Oxide 2 | Oxide 3 (ECL) | Oxide 2+ECL | Cap |
|---|---|---|---|---|---|---|---|---|
| REF | 31.1 | 26.1 | 19 | - | - | - | - | - |
| SAMPLE 1 | 28.6 | 25.3 | 18.5 | 5.4 nm | 6.0 nm | 0 nm | 6.0 nm | 3.8 nm |
| SAMPLE 2 | 30.6 | 25.4 | 18.3 | 5.4 nm | 6.0 nm | 0 nm | 6.0 nm | 4.5 nm |
| SAMPLE 3 | 34.1 | 25.8 | 18.7 | 5.4 nm | 6.0 nm | 0 nm | 6.0 nm | 5.3 nm |
| SAMPLE 4 | 34.3 | 25.9 | 18.7 | 5.4 nm | 6.0 nm | 0 nm | 6.0 nm | 6.0 nm |
| SAMPLE 5 | 36.6 | 26.3 | 19.4 | 5.4 nm | 2.6 nm | 3.4 nm | 6.0 nm | 3.5 nm |

| CELL | OW | 2TSoNR | 2TSNR | 10TMCW | Oxide 1 | Oxide 2 | Oxide 3 (ECL) | Oxide 2+ECL | Cap |
|---|---|---|---|---|---|---|---|---|---|
| REF | 32.8 | 26.9 | 19.7 | 82.7 | - | - | - | - | - |
| SAMPLE 1 | 30.3 | 26.0 | 18.9 | 82.5 | 5.4 nm | 6.0 nm | 0 nm | 6.0 nm | 3.5 nm |
| SAMPLE 2 | 30.1 | 25.8 | 18.9 | 83.6 | 5.4 nm | 5.2 nm | 0 nm | 5.2 nm | 3.5 nm |
| SAMPLE 3 | 31.2 | 25.6 | 18.7 | 82.1 | 5.4 nm | 4.2 nm | 0 nm | 4.2 nm | 3.5 nm |
| SAMPLE 4 | 35.3 | 26.8 | 19.8 | 84.0 | 5.4 nm | 4.2 nm | 1.8 nm | 6.0 nm | 3.5 nm |
| SAMPLE 5 | 38.9 | 26.8 | 19.7 | 91.4 | 5.4 nm | 1.4 nm | 4.6 nm | 6.0 nm | 3.5 nm |
| SAMPLE 6 | 38.9 | 27.0 | 19.8 | 93.5 | 5.4 nm | 1.8 nm | 4.2 nm | 6.0 nm | 3.5 nm |
| SAMPLE 7 | 38.7 | 27.1 | 20.0 | 89.4 | 5.4 nm | 2.2 nm | 3.8 nm | 6.0 nm | 3.5 nm |
| SAMPLE 8 | 38.2 | 27.1 | 19.9 | 90.7 | 5.4 nm | 2.6 nm | 3.4 nm | 6.0 nm | 3.5 nm |
| SAMPLE 9 | 38.2 | 26.9 | 19.9 | 89.2 | 5.4 nm | 3.0 nm | 3.0 nm | 6.0 nm | 3.5 nm |
| SAMPLE 10 | 37.4 | 27.0 | 19.9 | 87.6 | 5.4 nm | 3.4 nm | 2.6 nm | 6.0 nm | 3.5 nm |
| SAMPLE 11 | 36.4 | 26.9 | 19.9 | 85.8 | 5.4 nm | 3.8 nm | 2.2 nm | 6.0 nm | 3.5 nm |

FIG. 8

PERPENDICULAR MAGNETIC RECORDING MEDIA WITH OXIDE-CONTAINING EXCHANGE COUPLING LAYER

RELATED APPLICATIONS

This application is a divisional of U.S. patent application Ser. No. 12/638,905 filed Dec. 15, 2009, which is herein incorporated by reference.

FIELD OF THE INVENTION

The present invention relates to magnetic media, and more particularly, this invention relates to a magnetic medium having an oxide-containing exchange coupling layer.

BACKGROUND OF THE INVENTION

Developments have been made in the area of perpendicular magnetic recording media, with much of them focusing on increasing the recording density of the magnetic recording media by decreasing the bit error rate. A lower bit error rate can be achieved by decreasing the transition noise between adjacent bits, and the transition noise in turn can be decreased by increasing the magnetic decoupling between grains. Grains that are decoupled and magnetically isolated from one another can switch independently and may allow the media to form finer and narrower transitions.

High Ku magnetic materials are needed to keep small grains magnetic recording layer stable, but it is not easy to write to a high Ku recording layer, especially when the read/write head is small, as in high areal density magnetic recording. Media noise also increases when the Ku of the recording layer increases, and keeping magnetic core width (MCW) and magnetic write width (MWW) narrow is one of requirements for high track density.

In addition, signal-to-noise ratio (SNR), overwrite (OW), and MCW are a trilemma when designing high areal density perpendicular recording media. There is a trade-off among the three parameters. However, high performance perpendicular magnetic recording media requires continuous improvement on all the three key parameters. Several researchers have reported that exchange coupled composite media comprising hard and soft layers improve both SNR and OW. (Jian-Ping Wang et al., *IEEE Trans. Mag.*, 2005, Y. Inaba et al., *IEEE Trans. Mag.*, 2005). Proposed materials for the exchange coupling layer have been CoRu or CoCrPtB (Gunn Choe et al., *IEEE Trans. Mag.*, 2009). What is needed are new materials for the exchange coupling layer which improves OW, MCW, and SNR.

Therefore, it would be beneficial to the improvement of perpendicular recording media to magnetically decouple the magnetic grains of the magnetic layer of a magnetic recording medium.

SUMMARY OF THE INVENTION

A magnetic storage medium according to one embodiment includes a substrate; a first oxide magnetic layer formed above the substrate; a second oxide magnetic layer formed above the first oxide magnetic layer; an exchange coupling layer formed above the second oxide magnetic layer, the exchange coupling layer comprising an oxide; and a magnetic cap layer formed above the exchange coupling layer.

A method according to one embodiment includes forming a high Ku first oxide magnetic layer above a substrate by sputtering; forming a high Ku second oxide magnetic layer above the first oxide magnetic layer by sputtering, wherein oxygen is flowed during forming the second oxide magnetic layer; forming a first layer of an exchange coupling layer above the second oxide magnetic layer, the first layer of the exchange coupling layer comprising an oxide, wherein no oxygen is flowed during forming the first layer of the exchange coupling layer; forming a second layer of the exchange coupling layer above the first layer of the exchange coupling layer, the second layer of the exchange coupling layer comprising an oxide, wherein oxygen is flowed during forming the second layer of the exchange coupling layer; and forming a magnetic cap layer above the exchange coupling layer.

A method according to yet another embodiment includes forming a high Ku first oxide magnetic layer above a substrate by sputtering; forming a low Ku second oxide magnetic layer above the first oxide magnetic layer by sputtering; forming an exchange coupling layer of CoCrPt-oxide above the second oxide magnetic layer; and forming a magnetic cap layer above the exchange coupling layer.

Any of these embodiments may be implemented in a magnetic data storage system such as a disk drive system, which may include a magnetic head, a slider for supporting the head, a drive mechanism for passing a magnetic medium (e.g., hard disk) over the magnetic head, and a control unit electrically coupled to the magnetic head for controlling operation of the head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 8 is a table illustrating the effects of oxide exchange coupling layer thickness on OW, SNR and MCW.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a magnetic storage medium comprises a substrate; a first oxide magnetic layer formed above the substrate; a second oxide magnetic layer formed above the first oxide magnetic layer; an exchange coupling layer formed above the second oxide magnetic layer, the exchange coupling layer comprising an oxide; and a magnetic cap layer formed above the exchange coupling layer.

A method according to one general embodiment includes forming a high Ku first oxide magnetic layer above a substrate by sputtering; forming a high Ku second oxide magnetic layer above the first oxide magnetic layer by sputtering, wherein oxygen is flowed during forming the second oxide magnetic layer; forming a first layer of an exchange coupling layer above the second oxide magnetic layer, the first layer of the exchange coupling layer comprising an oxide, wherein no oxygen is flowed during forming the first layer of the exchange coupling layer; forming a second layer of the exchange coupling layer above the first layer of the exchange coupling layer, the second layer of the exchange coupling layer comprising an oxide, wherein oxygen is flowed during forming the second layer of the exchange coupling layer; and forming a magnetic cap layer above the exchange coupling layer.

A method according to one general embodiment includes forming a high Ku first oxide magnetic layer above a substrate by sputtering; forming a low Ku second oxide magnetic layer above the first oxide magnetic layer by sputtering; forming an exchange coupling layer of CoCrPt-oxide above the second oxide magnetic layer; and forming a magnetic cap layer above the exchange coupling layer.

Figure 1:
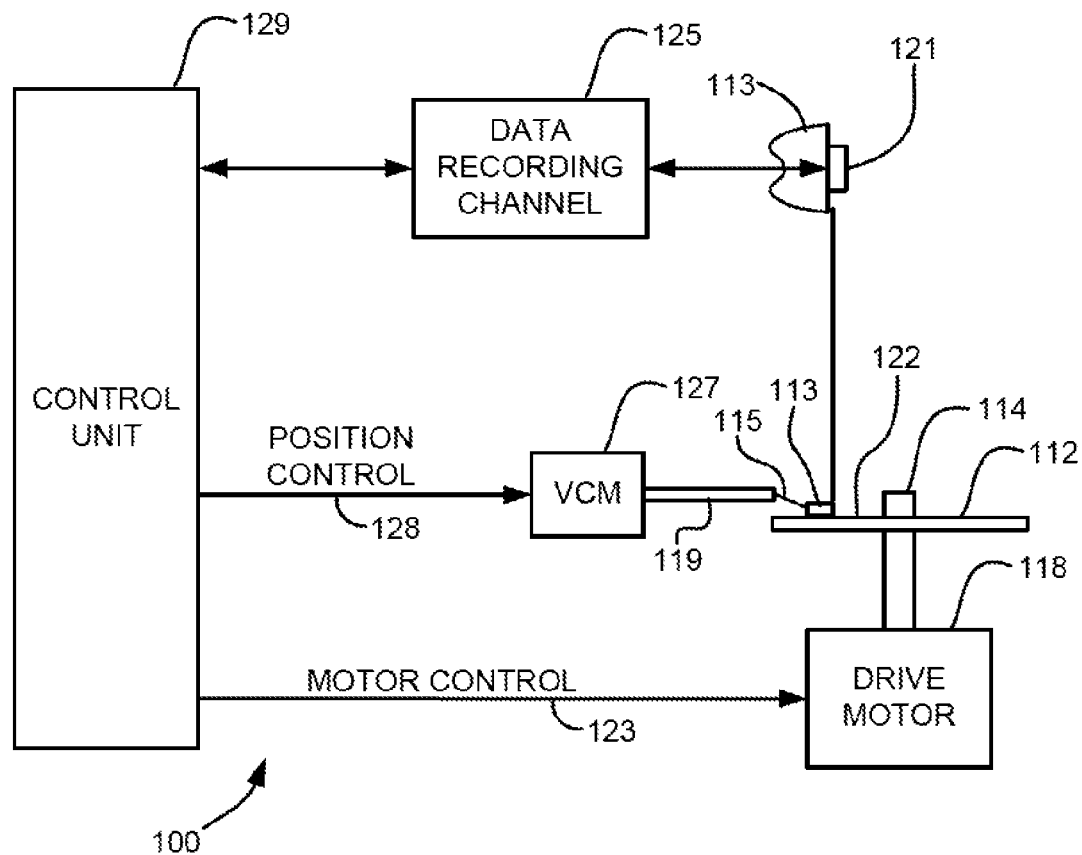
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator aim 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which typically extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

It has been surprisingly found that by using an oxide-containing exchange coupling layer in a magnetic storage medium such as a hard disk, the performance of the magnetic storage medium can be increased. Moreover, it has surprisingly been found that embodiments of perpendicular media having the particular stack of magnetic oxide layers disclosed herein have high Ku, good OW, low noise, and low MCW over a wide range of cap layer Hc values.

Figure 2:
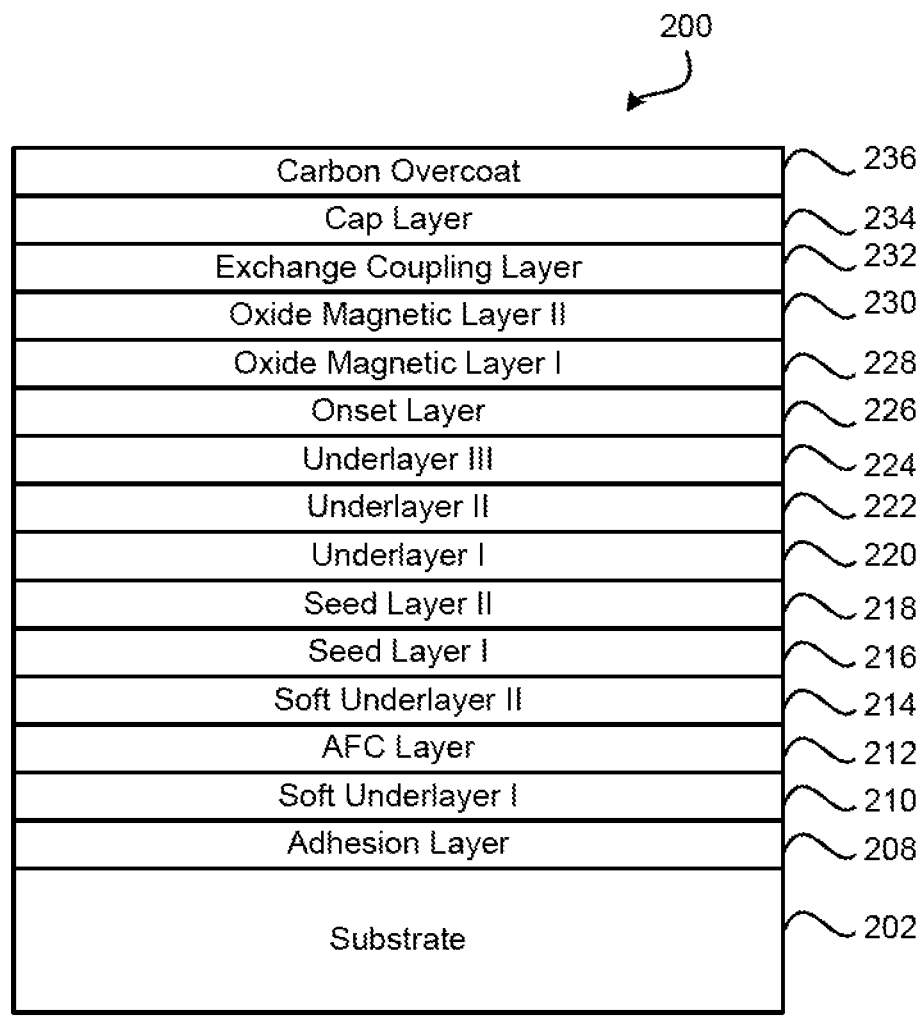
FIG. 2 is a schematic representation of layers of a magnetic storage medium, according to one embodiment.

Now referring to FIG. 2, in one embodiment, a magnetic storage medium 200 (e.g., a magnetic disk in a hard disk drive (HDD), etc.) is described. FIG. 2 is a highly simplified schematic diagram of a cross-sectional view of a magnetic storage medium 200, which extends in either direction horizontally from the view shown. Each layer shown in FIG. 2 may be formed through sputtering, or any other technique known in the art. Each layer may have a different composition from those described below in one illustrative embodiment. Moreover, additional layers may be added and/or shown layers removed in some embodiments. Thus, the disclosed embodiment is provided by way of example only and in no way should be construed as limiting.

The magnetic storage medium 200 includes a substrate 202. The substrate 202 may be formed of a glass material, and may have a greater thickness than the other layers formed thereon. The adhesion layer 208 may be comprised of aluminum, titanium, or compositions thereof, etc., and may function to prevent the layers formed above the substrate 202 from "peeling off" during use. The soft underlayers 210, 214 are separated by an anti-ferromagnetic coupling (AFC) layer 212, typically of Ru or other AFC material. The soft underlayers 210, 214 may be comprised of cobalt, iron, tantalum, zirconium, or compositions thereof, etc., which preferably provide a high moment. The seed layers 216, 218 may be comprised of any suitable material as would be known in the art, such as nickel, tungsten, chromium, titanium, combinations thereof, etc. The underlayers 220, 222, 224 may be comprised of any suitable material as would be known in the art, such as ruthenium, and may be formed under different pressures, such as a lower pressure for underlayer I, 220, and higher pressures for underlayers II, III, 222, 224, respectively. An onset layer 226 may also be present. An illustrative onset layer 226 comprises ruthenium, titanium, and/or oxides thereof, etc. First and second oxide magnetic layers 228, 230 are formed above, and preferably directly on, the onset layer 226. By directly on the onset layer 226, what is meant is that the first oxide magnetic layer 228 contacts the onset layer 226. Illustrative materials from which to form the first and/or second oxide magnetic layers 228, 230 include CoCrPtX+ oxide or $O_2$, where X may be B, Ta, Si, Ru, Ti, etc. and the oxide may be $TiO_x$, $SiO_x$, $B_2O_3$, $W_2O_5$, $Ta_2O_5$, etc.

An exchange coupling layer 232, a cap layer 234 e.g., of CoCrPtB, and an optional overcoat 236 e.g. of carbon, are formed above the oxide magnetic layers 228, 230. More detail about various layers is provided below.

Figure 3:
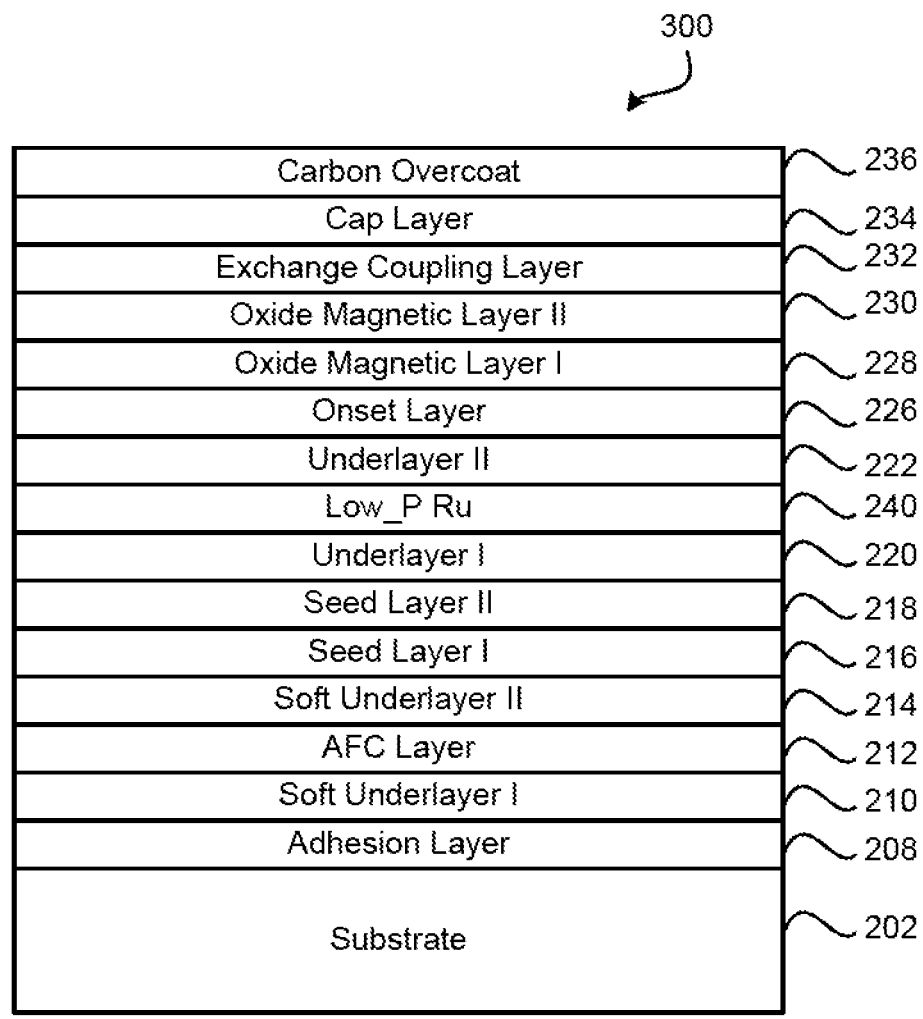
FIG. 3 is a schematic representation of layers of a magnetic storage medium, according to another embodiment.

To exemplify that various embodiments may have configurations other than those specifically shown, FIG. 3 illustrates an alternate embodiment, which except as otherwise described, has a similar structure to the medium 200 of FIG. 2, and therefore similar layers maintain common numbering. With reference to FIG. 3, a magnetic storage medium 300 includes first and second underlayers 220, 222 separated by a Ru layer 240 formed by low pressure sputtering.

An illustrative embodiment will now be described with reference to FIGS. 2-4, though it should be kept in mind that a variety of different structures may be used. This approach has surprisingly been found to relax the requirements for specific Hc values for the cap layer 234, and even allow use of high and low Ku oxide magnetic layers 228, 230, respectively. As shown, the first oxide magnetic layer 228 comprises a high Ku material such as CoCrPt-oxide or other material. An illustrative thickness of the first oxide magnetic layer 228 is between about 50 and about 70 angstroms, where "about X" of a value means "X±10% of X". However, as with any range given herein, the upper and lower values could be higher or lower in various other embodiments, particularly preferred embodiments being within the stated ranges. The second oxide magnetic layer 230 comprises a high Ku material such as CoCrPt-oxide or other material. The second oxide magnetic layer 230 may be formed by sputtering under high pressure (Hi_P) with oxygen being flowed into the sputtering chamber. An illustrative thickness of the second oxide magnetic layer 230 is between about 20 and about 40 angstroms.

Figure 4:
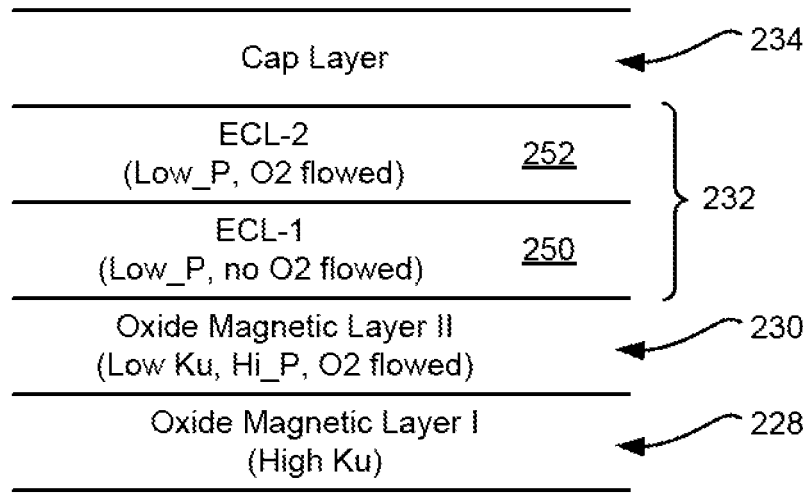
FIG. 4 is a schematic representation of layers of a magnetic storage medium, according to another embodiment.

Referring to FIG. 4, the exchange coupling layer 232 includes a first layer (ECL-1) 250 of material formed on the second oxide magnetic layer 230 and preferably of the same materials as the second oxide magnetic layer 230, though not necessarily in the same stoichiometric proportions. For example, the same sputtering target may be used to form both layers 230, 250. Moreover, the first layer is preferably formed under low pressure (Low_P) with no oxygen flowing into the sputtering chamber. Rather, the sputtering target includes the oxide. For example, the sputtering target may include one or more of $TiO_x$, $SiO_x$, $B_2O_3$, $W_2O_5$, $Ta_2O_5$, etc. Thus, where oxygen was flowed to form the second oxide magnetic layer 230, the first layer 250 has an almost identical composition except for a lower oxygen content than the second oxide magnetic layer 230.

A second layer (ECL-2) 252 of the exchange coupling layer 232 is formed above the first layer 250, the second layer 252 comprising a material such as CoCrPtBTa-oxide, which is preferably formed by sputtering under low pressure with oxygen flowing into the sputtering chamber, preferably at a flow rate sufficient to generate an oxygen content in the second layer 252 of between about 1 and about 20 atomic percent.

An illustrative combined thickness of the first and second layers 250, 252 is between about 10 and about 40 angstroms. The cap layer 234, e.g., of CoCrPtB or other suitable magnetic material, is formed above the exchange coupling layer 232.

Figure 5:
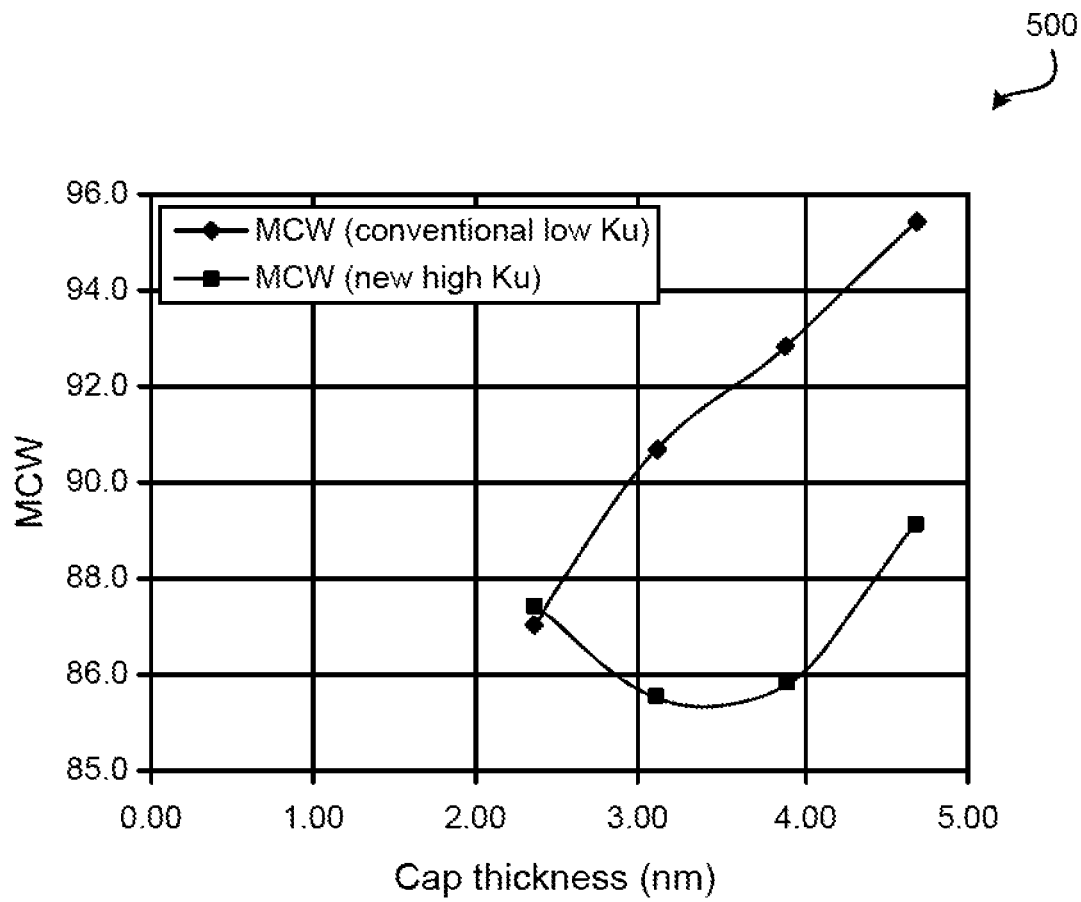
FIG. 5 is a chart depicting MCW as a function of cap thickness for different materials.
Figures 6, 7:
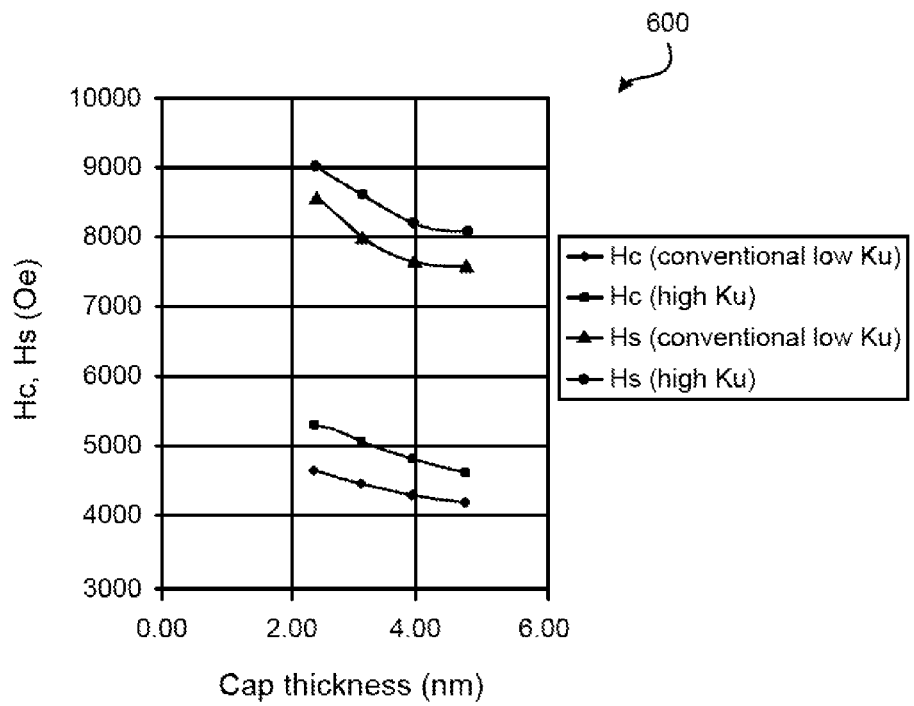
FIG. 6 is a chart depicting Hc and Hs as a function of cap thickness for different materials.
FIG. 7 is a table illustrating the effects of presence of an oxide exchange coupling layer and cap layer thickness on OW and SNR.

FIG. 5 depicts a graph 500 of MCW vs. cap layer thickness for a head having a 2.85 nm (combined thickness) high Ku first and second oxide magnetic layers 228, 230 as shown in FIG. 4, and a comparative head having a high Ku second oxide magnetic layer and a low Ku second oxide magnetic layer. FIG. 6 depicts a graph 600 of HC and Hs vs. cap layer thickness for the same heads. The cap layer in both cases was CoCrPtB, while the high Ku oxide magnetic layer in the preferred embodiment was CoCtPt-oxide. As shown, the use of the high Ku oxide magnetic layers provides a significant advantage over the approach using a low Ku second oxide magnetic layer. For example, graded media is a one-dimensional concept. The graded media concept focuses on the vertical incoherent rotation within a single grain or vertical stack without regarding interactions with neighboring grains. In conventional and graded structures, incoherent rotation is enhanced by thickening the cap. However, this introduces intergranular exchange both vertically & laterally. The vertical exchange is important to assist the reversal of the high Ku base layer, but the lateral exchange serves to broaden the magnetic core width, which is not desirable beyond a certain point.

With the high Ku oxide magnetic layer, an additional advantage lies with the ability to vary or tune the degree of lateral vs. vertical exchange in two aspects, namely oxide magnetic layer thickness and degree of oxidation. This concept serves to integrate the graded media concept with the real world complex issue of controlling or tuning the interactions with nearest neighbor grains.

Modeling has also shown that the use of a thicker cap layer, now enabled by embodiments of the present invention, increase OW, increase SNR, where the improvement in SNR is greatest where an oxide exchange coupling layer is used. This effect is exemplified in the table in FIG. 7. Moreover, the SNR improvement is exhibited at a wide range of exchange coupling layer thicknesses, as exemplified in the table of FIG. 8. In FIGS. 7 and 8, the oxide 1 is $CoCr_{14}Pt_{18}(B_2O_3)_3(Ta_2O_5)_1$; the oxide 2 and oxide 3 (ECL) is: $CoCr_{22}Pt_{16}(B_2O_3)_3(Ta_2O_5)_1$; and the cap is: $CoCr_{14}Pt_{18}B_{11}$. Also in FIGS. 7 and 8, several of the various parameters such as OW and Cap are described elsewhere herein. 2TSoNR is the spectral Signal-to-Noise ratio at a fixed signal measured at a fixed linear density. For the 2TSoNR measurement, So is the low frequency signal (So) [measured at ~100 kfci (kiloflux changes per inch)] over the integrated noise power at a frequency of T/2. Frequency T (or 1T) is the highest linear frequency for a particular program. For example, if 1T=1460 kfci, 2T indicates that the frequency is half of the 1T frequency (i.e., 2T=730 kfci), and 10T would be 1/10 of the 1T frequency (e.g., 10T=146 kfci). 2TSNR is the spectral Signal-to-Noise ratio of the signal (S) (at a frequency T/2) over the integrated noise power at a frequency of T/2. It differs from the 2TSoNR only in that the signal used for the ratio is measured at the higher 2T frequency and not the low frequency signal So. SoNR measurements provide a better sense of how the noise alone increases with increasing frequency, whereas SNR measurements combines the signal rolloff (signal decreases with increasing frequency) and the integrated noise increase with increasing linear frequency. 10TMCW is the magnetic core width at frequency T/10. This is measured by writing a 10T pattern (low frequency pattern) on an alternating current- (AC-)erased background, and then measuring signal amplitude as the head moves across the written track. The 10T MCW width is determined as the full width between the points at which the signal amplitude has dropped by 50% from the maximum (usually in the center of the track).

In PMR media, the measured MCW changes as a function of linear frequency for a variety of reasons related to the writing process. The widest MCW is observed at the lowest frequency, and decreases with increasing frequency. By measuring and comparing the 10TMCW widths, it can provide a gauge of writability (narrow MCW indicates hard-to-write media or a very poor writing head), and also provides a gauge on how narrow tracks you could write on that media with that head (indication of track squeeze behavior).

Figure 9:
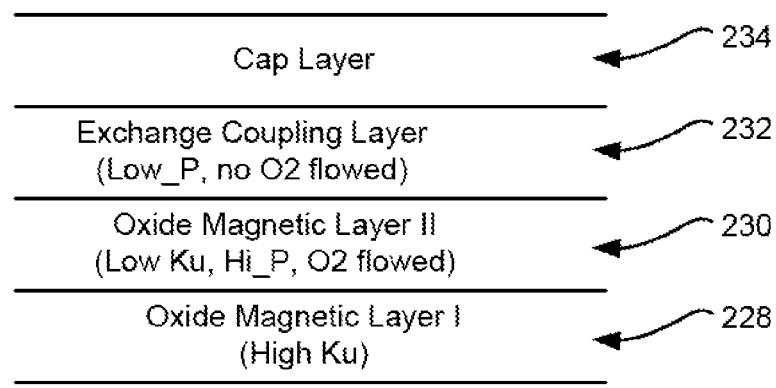
FIG. 9 is a schematic representation of layers of a magnetic storage medium, according to another embodiment.

Another illustrative embodiment will now be described with reference to FIGS. 2, 3 and 9, though it should be kept in mind that a variety of different structures may be used. This approach uses a CoCrPt-oxide material as the exchange coupling layer 232 that is sputter-deposited without flowing oxygen into the sputtering chamber at low pressure such that the resulting exchange coupling layer 232 is positioned between CoPtCr-oxide magnetic layers 228, 230 and the magnetic cap layer 234. By using a CoCrPt-oxide exchange coupling layer, it has been surprisingly and unexpectedly found that the media's OW, MCW, and SNR can be significantly improved.

As shown, the first oxide magnetic layer 228 comprises a high Ku material such as CoCrPt-oxide or other material. The second oxide magnetic layer 230 comprises a low Ku material such as CoCrPt-oxide or other material. An illustrative combined thickness of the first and second oxide magnetic layers 228, 230 is between about 100 and about 150 angstroms.

As alluded to above, the exchange coupling layer 232 is sputter-deposited without flowing oxygen into the sputtering chamber, e.g., in a pure Ar gas, at low pressure. Here, the sputtering target includes the oxide. For example, the sputtering target may include one or more oxide such as $TiO_2$, $SiO_2$, $B_2O_3$, $W_2O_5$, $Ta_2O_5$, $NbO_2$, $CoO$, $Co_3O_4$, etc.

The exchange coupling layer 232 preferably includes about 2 to about 20 atomic percent of the oxide, and more preferably between about 4 and about 14 atomic percent. In one embodiment, the exchange coupling layer 232 comprises about 8 atomic percent oxide. The exchange coupling layer 232 may be between about 10 and about 30 angstroms thick, more preferably between about 10 and about 20 angstroms thick.

The cap layer 234, e.g., of CoCrPtB or other suitable magnetic material, is formed above the exchange coupling layer 232.

Figure 10:
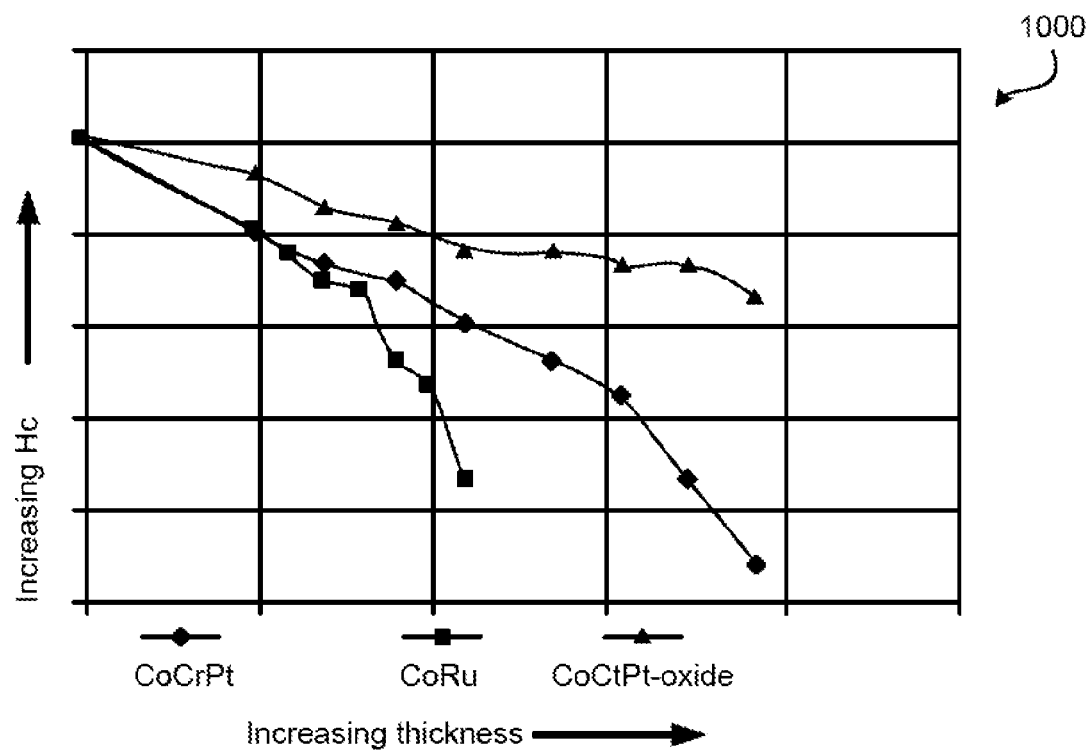
FIG. 10 is a chart depicting Hc as a function of exchange coupling layer thickness with CoCrPt, CoRu and CoCrPt-oxide materials.

Without wishing to be bound by any theory, it surprisingly appears that the Hc characteristics of a CoCrPt-oxide exchange coupling layer may provide an advantage in narrowing the MCW. FIG. 10 is a graph 1000 showing Hc as a function of exchange coupling layer thickness for exchange coupling layers made of CoCrPt, CoRu and CoCrPt-oxide materials, respectively. As shown, the Hc remains fairly stable for the CoCrPt-oxide exchange coupling layer, while the Hc of the exchange coupling layers of the other materials falls off rather quickly with increasing thickness.

Figure 11:
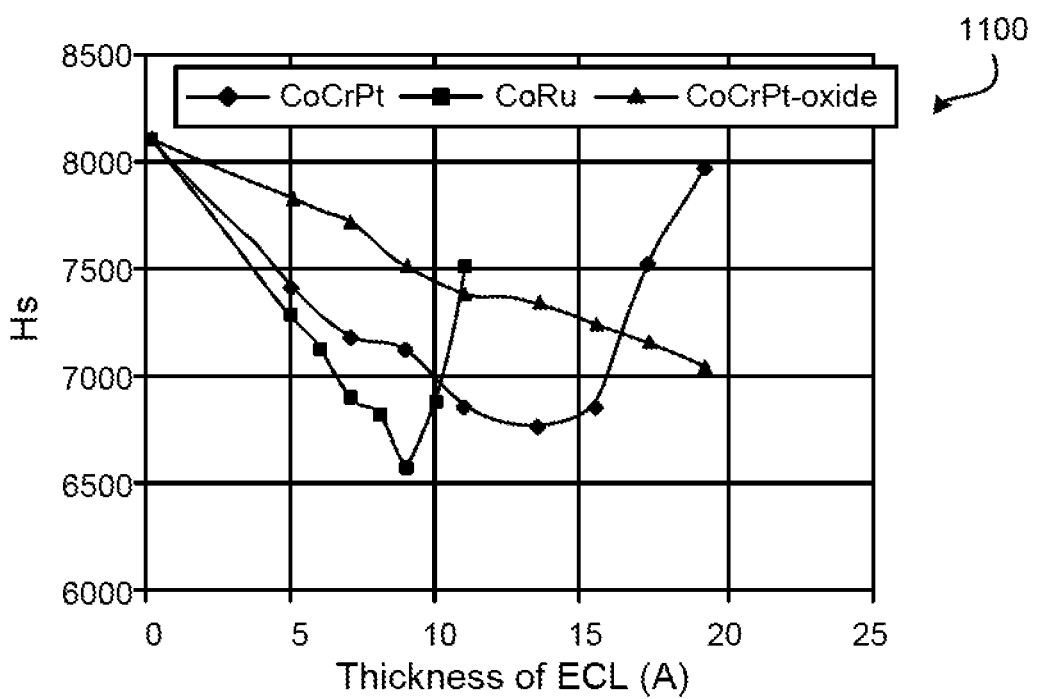
FIG. 11 is a chart depicting Hs as a function of exchange coupling layer thickness with CoCrPt, CoRu and CoCrPt-oxide materials.

It also surprisingly appears that the saturation field (Hs) is a parameter which can be correlated to OW and MCW. The chart 1100 of FIG. 11 shows the Hs as a function of exchange coupling layer thickness with different materials. For CoRu and CoCrPt, when the exchange coupling layer thickness becomes thick, the magnetic cap layer 234 is weakly coupled to the oxide magnetic layers 228, 230, and therefore, provide less assistance in switching in the oxide magnetic layers 228, 230, resulting in an increase in Hs. However, CoCrPt-oxide does not show any jump in Hs at higher thicknesses.

Figure 12:
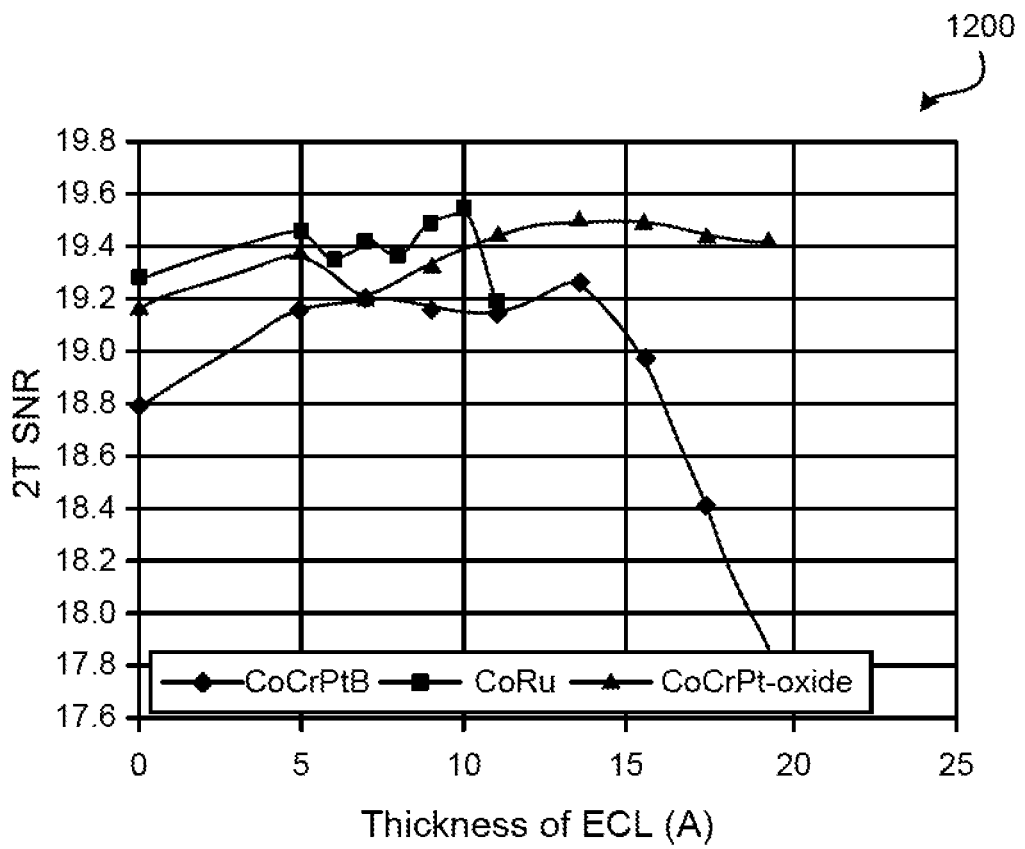
FIG. 12 is a chart depicting 2T SNR as a function of exchange coupling layer thickness with CoCrPt, CoRu and CoCrPt-oxide materials.

FIG. 12 is a chart 1200 showing the SNR as a function of exchange coupling layer thickness with different materials. For CoRu and CoCrPtB, the media SNR slightly increase as exchange coupling layer thickness increases in the thin region; however, the SNR decreases at thicker exchange coupling layer levels due to high Hs which results in poor OW. For CoCrPt-oxide, the SNR can be maintained because there is surprisingly no increase of Hs at the thick exchange coupling layer region.

Figure 13:
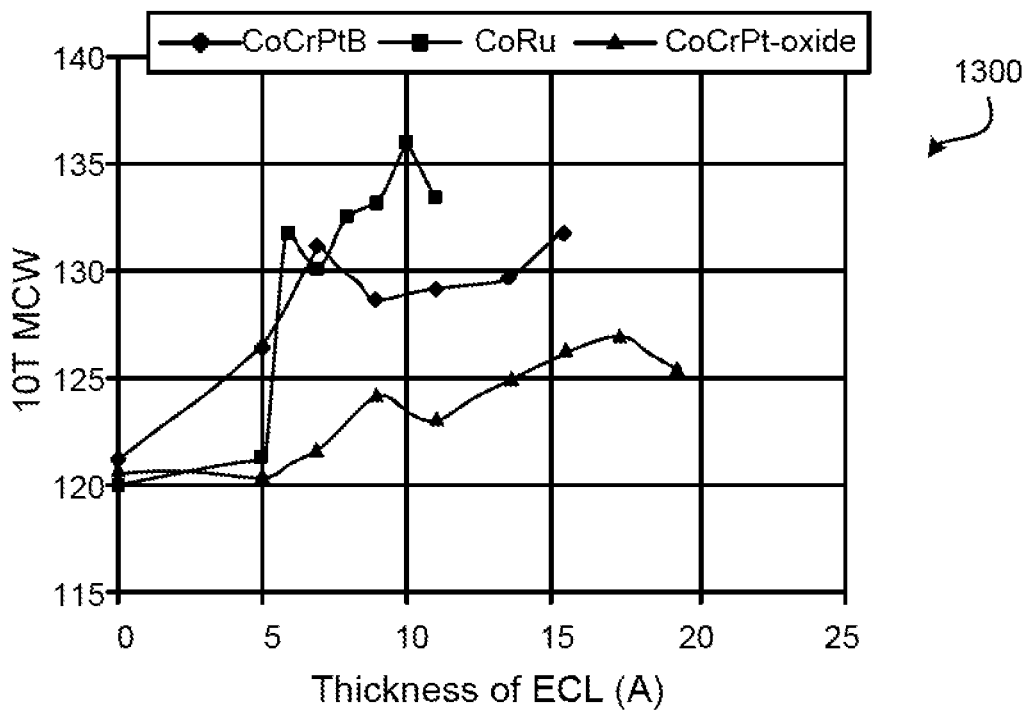
FIG. 13 is a chart depicting MCW as a function of exchange coupling layer thickness with CoCrPt, CoRu and CoCrPt-oxide materials.

FIG. 13 is a chart 1300 showing the MCW as a function of exchange coupling layer thickness with different materials. For a fixed exchange coupling layer thickness, such as a thickness of 10 Å on the plot shown in FIG. 13, a CoCrPt-oxide exchange coupling layer MCW is about 10 nm thinner than a CoRu exchange coupling layer MCW, and about 5 nm thinner than a CoCrPtB exchange coupling layer MCW.

Figure 14:
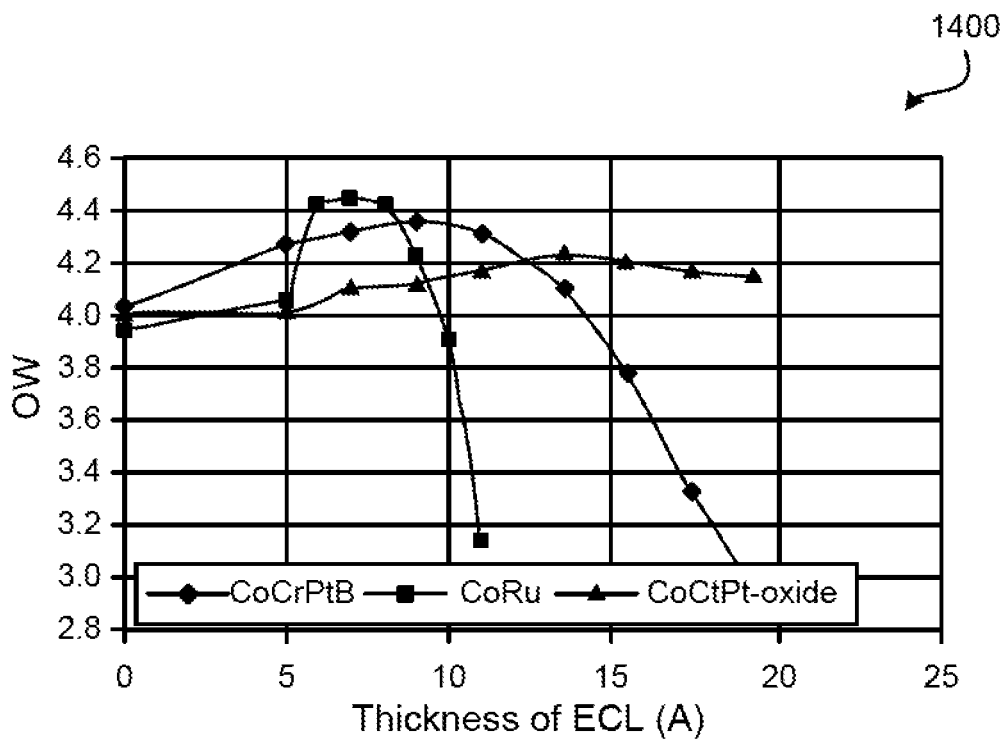
FIG. 14 is a chart depicting OW as a function of exchange coupling layer thickness with CoCrPt, CoRu and CoCrPt-oxide materials.

FIG. 14 is a chart 1400 depicting OW as a function of exchange coupling layer thickness with different materials. From FIG. 12, it is seen that the optimized exchange coupling layer thickness at maximum SNR is 6-8 angstroms for CoRu, 5-13 angstroms for CoCrPtB, and greater than 10 angstroms for CoCrPt-oxide. Note that although CoRu and CoCrPtB exchange coupling layers have a 2 dB better overwrite better than CoCrPt-oxide at the optimized thickness, this small difference can be compensated from optimizing the soft underlayer thickness and composition of the cap layer. The recording performance after optimizing the soft underlayer ($CoFe_{51}Ta_{10}Zr_5$) and composition of cap layer ($CoPt_{18}Cr_{15}B_7$) with different exchange coupling layer materials is listed in Table 1, below. Table 1 includes TAA HF, which is the track average signal at high frequencies, TAA LF, which is the track average signal at low frequencies, and SER, which is the soft error rate.

TABLE 1

| ECL | OW | Res | TAA HF | TAA LF | MCW | SER | SNR |
|---|---|---|---|---|---|---|---|
| CoRu | 26.1 | 36.3 | 6.1 | 16.8 | 84 | −3.48 | 16.5 |
| CoCrPtB | 26.4 | 36.1 | 6.1 | 16.9 | 84 | −3.57 | 16.4 |
| CoCrPt-oxide | 28.4 | 36.1 | 6.3 | 17.5 | 83 | −3.93 | 16.7 |

Thus, embodiments presented herein are able to break through the aforementioned trilemina as well as improve OW, MCW and SNR/SER at the same time, as shown for a medium using a CoCrPt-oxide exchange coupling layer, when compared with a medium using a CoRu or CoCrPtB exchange coupling layer, as shown in Table 1.

The selection of the proper exchange coupling layer parameters is critical to achieve the desired performance improvement, according to one embodiment. The CoCrPt-oxide alloys should contain Pt in an amount greater than 0 atomic percent to about 20 atomic percent, Cr in the range of about 20 atomic percent to about 40 atomic percent, and less than about 20 atomic percent of $SiO_x$, $Ta_2O_5$, $TiO_2$, $NbO_2$, CoO, $CO_3O_4$, etc. Other elements such B, Cu, Ta, Ni, V, Mo, Ru, Ti, Mn and so on with concentration of greater than 0 to about 10 atomic percent can be added into the alloys. The thickness of the exchange coupling layer is also critical to obtain the recording property improvement. The typical thickness of the exchange coupling layer is in the range of about 10 to about 30 angstroms.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
    forming a first oxide magnetic layer above a substrate by sputtering;
    forming a second oxide magnetic layer directly on the first oxide magnetic layer by sputtering, wherein oxygen is flowed during forming the second oxide magnetic layer;
    forming a first layer of an exchange coupling layer above the second oxide magnetic layer, the first layer of the exchange coupling layer comprising an oxide, wherein no oxygen is flowed during forming the first layer of the exchange coupling layer;
    forming a second layer of the exchange coupling layer directly on the first layer of the exchange coupling layer, the second layer of the exchange coupling layer comprising an oxide, wherein oxygen is flowed during forming the second layer of the exchange coupling layer, the second layer of the exchange coupling layer having a different composition than the first layer of the exchange coupling layer; and
    forming a magnetic cap layer above the exchange coupling layer.

2. The method as recited in claim 1, wherein the first layer of the exchange coupling layer is formed of a same material as the second oxide magnetic layer, the first layer of the exchange coupling layer having a lower oxygen content than the second oxide magnetic layer.

3. The method as recited in claim 1, wherein a same sputtering target is used for forming the first layer of the exchange coupling layer and the second oxide magnetic layer, wherein the first layer of the exchange coupling layer has a lower oxygen content than the second oxide magnetic layer.

4. The method as recited in claim 1, wherein the second oxide magnetic layer is formed under a higher pressure than the first layer of the exchange coupling layer.

5. The method as recited in claim 1, wherein at least one layer of the exchange coupling layer is formed of CoCrPt-oxide.

6. The method as recited in claim 1, wherein the second layer of the exchange coupling layer has an oxygen content of between about 1 and about 20 atomic percent.

7. The method as recited in claim 1, wherein the oxide in the exchange coupling layer is selected from a group consisting of $TiO_2$, $SiO_2$, $B_2O_3$, $W_2O_5$, $Ta_2O_5$, $NbO_2$, CoO, and $CO_3O_4$.

8. The method as recited in claim 1, wherein the second layer of the exchange coupling layer is formed of a different material than the first layer of the exchange coupling layer.

9. A method, comprising:
    forming a first oxide magnetic layer above a substrate by sputtering;
    forming a second oxide magnetic layer directly on the first oxide magnetic layer by sputtering, wherein the second oxide magnetic layer is characterized by a lower Ku than the Ku of the first oxide magnetic layer;
    forming an exchange coupling layer of CoCrPt-oxide above the second oxide magnetic layer, wherein no oxygen is flowed during the forming of at least a portion of the exchange coupling layer; and
    forming a magnetic cap layer above the exchange coupling layer.

10. The method as recited in claim 9, wherein no oxygen is flowed during forming the exchange coupling layer.

11. The method as recited in claim 9, wherein the portion of the exchange coupling layer is formed by sputtering with no oxygen flowing into a sputtering chamber during formation thereof and another portion of the exchange coupling layer is formed with oxygen flowing into the sputtering chamber.

12. The method as recited in claim 9, wherein the exchange coupling layer comprises about 2 to about 20 atomic percent of the oxide.

13. The method as recited in claim 9, wherein the oxide in the exchange coupling layer is selected from a group consisting of $TiO_2$, $SiO_2$, $B_2O_3$, $W_2O_5$, $Ta_2O_5$, $NbO_2$, CoO, and $CO_3O_4$.

14. The method as recited in claim 9, wherein the exchange coupling layer includes at least one of B, Cu, Ta, Ni, V, Mo, Ru, Ti, and Mn in a concentration of greater than 0 to about 10 atomic percent.

15. The method as recited in claim 9, wherein a first portion of the exchange coupling layer adjacent the second oxide magnetic layer is formed of a same material as the second oxide magnetic layer, the first portion of the exchange coupling layer having a lower oxygen content than the second oxide magnetic layer.

16. The method as recited in claim 15, wherein a second portion of the exchange coupling layer is formed of a different material than the first portion of the exchange coupling layer.

17. The method as recited in claim 9, wherein a second portion of the exchange coupling layer is formed of a different material than the first portion of the exchange coupling layer.

18. The method as recited in claim 1, wherein both of the exchange coupling layers are formed of CoCrPt-oxide.

19. The method as recited in claim 9, wherein the entire exchange coupling layer is formed by sputtering with no oxygen flowing into a sputtering chamber during formation thereof.

20. The method as recited in claim 17, wherein the portion of the exchange coupling layer has a lower oxygen content than the second portion of the exchange coupling layer.

* * * * *

UNITED STATES PATENT AND TRADEMARK OFFICE
CERTIFICATE OF CORRECTION

| | | |
|---|---|---|
| PATENT NO. | : 8,747,628 B2 | |
| APPLICATION NO. | : 13/438804 | |
| DATED | : June 10, 2014 | |
| INVENTOR(S) | : Bian et al. | |

It is certified that error appears in the above-identified patent and that said Letters Patent is hereby corrected as shown below:

In the specification:

col. 4, line 4 replace "aim" with --arm--;

col. 7, line 61 replace "Au" with --An--;

col. 9, line 10 replace "trilemina" with --trilemma--;

col. 9, line 18 replace "O" with --0--.

Signed and Sealed this
Second Day of September, 2014

Michelle K. Lee
*Deputy Director of the United States Patent and Trademark Office*